United States Patent
Han et al.

(10) Patent No.: US 11,538,436 B2
(45) Date of Patent: Dec. 27, 2022

(54) DISPLAY DRIVER INTEGRATED CIRCUIT AND DISPLAY SYSTEM HAVING THE SAME

(71) Applicant: SAMSUNG DISPLAY CO., LTD., Yongin-si (KR)

(72) Inventors: Ho Seok Han, Yongin-si (KR); Jun Yong Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 97 days.

(21) Appl. No.: 16/808,962

(22) Filed: Mar. 4, 2020

(65) Prior Publication Data

US 2020/0365111 A1 Nov. 19, 2020

(30) Foreign Application Priority Data

May 15, 2019 (KR) .......................... 10-2019-0057158

(51) Int. Cl.
*G09G 5/00* (2006.01)
*G06F 21/12* (2013.01)

(52) U.S. Cl.
CPC ........... *G09G 5/003* (2013.01); *G06F 21/123* (2013.01); *G09G 5/006* (2013.01); *G09G 2310/027* (2013.01); *G09G 2340/02* (2013.01); *G09G 2358/00* (2013.01)

(58) Field of Classification Search
CPC ............. G09G 5/003; G09G 2310/027; G09G 2358/00; G09G 5/006; G06F 21/123
See application file for complete search history.

(56) References Cited

U.S. PATENT DOCUMENTS

| | | | | |
|---|---|---|---|---|
| 5,825,879 | A * | 10/1998 | Davis ................. | H04N 21/4405 713/192 |
| 8,913,052 | B2 * | 12/2014 | Gu ....................... | G09G 3/3225 345/211 |
| 9,081,963 | B1 * | 7/2015 | Sima ....................... | G06F 21/57 |
| 9,153,177 | B2 * | 10/2015 | Hong ................... | G09G 3/3291 |
| 9,722,805 | B2 * | 8/2017 | Suzuki ................. | H04L 9/0866 |
| 9,941,880 | B1 * | 4/2018 | Lesea ................... | H03K 19/003 |

(Continued)

FOREIGN PATENT DOCUMENTS

KR  10-2017-0009541  1/2017

*Primary Examiner* — Amare Mengistu
*Assistant Examiner* — Jennifer L Zubajlo
(74) *Attorney, Agent, or Firm* — F. Chau & Associates, LLC (57) ABSTRACT

Systems and methods are described for a display driver integrated circuit that is configured to certify whether an application processor and the display driver integrated circuit are genuine products. The display driver integrated circuit includes: an encryptor for generating first encrypted data by encrypting first data; a data converter for converting the first data into a first converted signal expressed with four or more voltage levels; an interface for providing the first converted signal to a host processor, and receiving, from the host processor, a second converted signal corresponding to second encrypted data generated by the host processor; and a determiner for controlling a display panel by comparing the first encrypted data with converted data corresponding to the second encrypted data. The second converted signal transferred through the interface is expressed with the voltage levels.

20 Claims, 6 Drawing Sheets

(56) References Cited

U.S. PATENT DOCUMENTS

| | | | |
|---|---|---|---|
| 10,289,831 B2 | 5/2019 | Lee et al. | |
| 2007/0132621 A1* | 6/2007 | Choi | G09G 3/3291 |
| | | | 341/144 |
| 2008/0218456 A1* | 9/2008 | Park | H03M 1/682 |
| | | | 345/77 |
| 2010/0142594 A1* | 6/2010 | Yule | G01S 19/35 |
| | | | 375/147 |
| 2011/0087897 A1* | 4/2011 | Nelson | H04L 9/0894 |
| | | | 713/193 |
| 2011/0314299 A1* | 12/2011 | Lee | G06F 3/147 |
| | | | 345/204 |
| 2015/0067895 A1* | 3/2015 | Vasyltsov | H04L 9/3278 |
| | | | 726/32 |
| 2016/0323620 A1* | 11/2016 | Kim | H04N 21/4126 |
| 2017/0019250 A1* | 1/2017 | Lee | H04L 9/3226 |
| 2017/0124957 A1* | 5/2017 | Ahn | G09G 3/3291 |
| 2017/0235939 A1* | 8/2017 | Caporale | G06F 3/1239 |
| | | | 726/2 |
| 2018/0024927 A1* | 1/2018 | Ryu | G06F 21/85 |
| | | | 365/189.05 |
| 2019/0130845 A1* | 5/2019 | Han | G09G 3/3291 |
| 2019/0198082 A1* | 6/2019 | O | G09C 1/00 |
| 2019/0347447 A1* | 11/2019 | Tomita | H01L 23/576 |
| 2020/0004992 A1* | 1/2020 | Chong | G06F 21/6218 |
| 2020/0342142 A1* | 10/2020 | Savidis | G06F 21/75 |

* cited by examiner

DISPLAY DRIVER INTEGRATED CIRCUIT AND DISPLAY SYSTEM HAVING THE SAME

CROSS-REFERENCE TO RELATED APPLICATION

The present application claims priority under 35 U.S.C. § 119(a) to Korean patent application 10-2019-0057158 filed on May 15, 2019, in the Korean Intellectual Property Office, the entire disclosure of which is incorporated herein by reference.

BACKGROUND

1. Technical Field

The present disclosure generally relates to an electronic device having a display system, and more particularly, to a display driver integrated circuit and a display system having the same.

2. Related Art

Display systems are included in many electronic devices such as computers, tablet PCs, smartphones, and wearable electronics. Consumers demand continuous improvement in these devices. Improvement of a display device may include increased resolution, which can also result in more data being transmitted to and from the device. This may put additional demand on components of the display, or on other components of the device. When new electronic devices are released, imitation products built to lesser specifications may follow. These imitation products may not be capable of supporting the levels of data used by the new devices, which can result in hardware damage. Therefore, there is a need in the art for distinguishing genuine display components from imitation products.

SUMMARY

Embodiments provide a display driver integrated circuit configured to certify whether an application processor and the display driver integrated circuit are genuine products.

Embodiments also provide a display system having the display driver integrated circuit.

In accordance with an aspect of the present disclosure, there is provided a display driver integrated circuit including: an encryptor configured to generate first encrypted data by encrypting first data; a data converter configured to convert the first data into a first converted signal including four or more voltage levels; an interface configured to provide the first converted signal to a host processor, and receive a second converted signal corresponding to second encrypted data generated by the host processor; and a determiner configured to control a display panel by comparing the first encrypted data with converted data corresponding to the second encrypted data, wherein the second converted signal received by the interface includes the four or more voltage levels.

The first data may be a unique chip identification (ID) of the display driver integrated circuit.

The data converter may include a digital-analog converter configured to convert the first data in a digital format into the first converted signal.

The data converter may include a resistor string for dividing a first reference voltage and a second reference voltage into the voltage levels.

The first converted signal may include a data security level unrelated to the chip ID.

The data security level may correspond to a voltage level selected from the four or more voltage levels. The chip ID may correspond to voltage levels other than the selected voltage level.

The data converter may further include a security data generator configured to insert security data in a random format into the chip ID. The security data may include the data security level.

The interface may accord with Mobile Industry Processor Interface (MIPI) Alliance Specification for Display Serial Interface and MIPI Alliance Specification for D-PHY. The display driver integrated circuit may further include security channels configured to transfer the first converted signal to the host processor, and receive the second converted signal from the host processor.

When the display driver integrated circuit wakes up, the first converted signal and the second converted signal may be transferred through the security channels.

The determiner may include: a valid data extractor configured to convert the second converted signal into third encrypted data including valid voltages other than a data security level unrelated to the first data; and a comparator configured to compare the first encrypted data and the third encrypted data, and output a control signal for controlling at least one of the host processor and the display panel, based on the comparison result.

When the first encrypted data and the third encrypted data are equal to each other, the host processor and the display driver integrated circuit may operate normally.

When the first encrypted data and the third encrypted data are different from each other, the comparator may stop driving of at least one of the host processor and the display driver integrated circuit.

The encryptor may use a public key encryption algorithm.

In accordance with another aspect of the present disclosure, there is provided a display system including: a host processor configured to encrypt a chip ID, convert and output the encrypted chip ID including four or more voltage levels, and output a data load command and input image data; and a display module controlled by the host processor, wherein the display module includes: a display panel including a plurality of pixels, the display panel displaying an image, based on the input image data; and a display driver integrated circuit configured to provide the chip ID in a digital format to the host processor, generate first encrypted data obtained by encrypting the chip ID, and control the display module, based on comparing the first encrypted data with data received from the host processor.

The host processor may include: a first encryptor configured to generate second encrypted data by encrypting the chip ID; a data converter configured to convert the second encrypted data into a converted signal including the four or more voltage levels; and an interface configured to receive the chip ID from the display driver integrated circuit, and transmit the converted signal to the display driver integrated circuit.

The display driver integrated circuit may include: a second encryptor configured to generate the first encrypted data by encrypting the chip ID; and a determiner configured to re-convert the converted signal into the second encrypted data in a digital format, compare the second encrypted data and the first encrypted data, and control at least one of the host processor and the display driver integrated circuit, based on the comparison result.

When the display driver integrated circuit wakes up, the chip ID and the converted signal may be transmitted between the host processor and the display driver integrated circuit through security channels instead of channels for transmitting the input image data and the command.

The display driver integrated circuit may include: a first encryptor configured to generate the first encrypted data by encrypting the chip ID; a data converter configured to convert the chip ID into a first converted signal in an analog format, including the four or more voltage levels; an interface configured to provide the first converted signal to the host processor, and receive a second converted signal corresponding to second encrypted data generated by the host processor; and a determiner configured to control the display panel by comparing the first encrypted data with data converted from the second encrypted data.

The data converter may insert security data in a random format into the chip ID, and convert the chip ID into which the security data is inserted into the first converted signal in the analog format.

The host processor may include: a first data converter configured to convert the first converted signal into converted data in a digital format; a second encryptor configured to generate the second encrypted data by encrypting the converted data; a second data converter configured to convert the second encrypted data into a second converted signal including the four or more voltage levels; and an interface configured to receive the first converted signal from the display driver integrated circuit, and transmit the second converted signal to the display driver integrated circuit.

A method of component verification is described. The method may include encrypting first data that includes a chip ID; converting the first data from a digital format to an analog format including four or more voltage levels; transmitting the converted first data to a host processor; receiving encrypted second data from the host processor in response to the converted first data; comparing the encrypted first data with the encrypted second data; and controlling a display based at least in part on the comparison.

BRIEF DESCRIPTION OF THE DRAWINGS

Example embodiments will now be described more fully hereinafter with reference to the accompanying drawings; however, the embodiments may be in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, the element can be the only element between the two elements, or one or more intervening elements may also be present. Like reference numerals refer to like elements throughout.

DETAILED DESCRIPTION

The present disclosure describes systems and methods for genuine product certification of an electronic device. By implementing embodiments of the present disclosure, the production and spread of imitations and illegal reproductions can be prevented.

Hereinafter, exemplary embodiments will be described in more detail with reference to the accompanying drawings. Throughout the drawings, the same reference numerals are given to the same elements, and their overlapping descriptions will be omitted.

Figure 1:
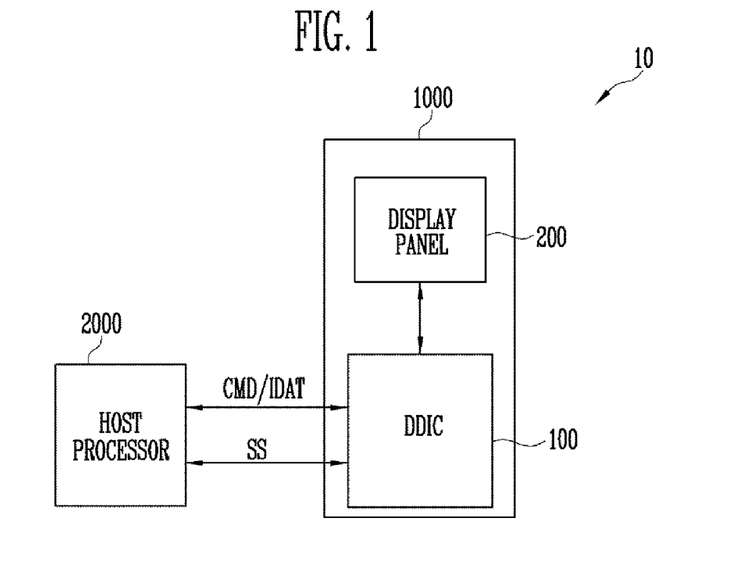
FIG. 1 is a block diagram representing a display system in accordance with an embodiment of the present disclosure.

FIG. 1 is a block diagram representing a display system in accordance with an embodiment of the present disclosure.

Referring to FIG. 1, the display system 10 may include a display module 1000 and a host processor 2000.

The display system 10 may further include a nonvolatile memory. In an embodiment, the display system 10 may further include an additional storage device, an input/output device, a power management device, a communication module, a sensor module, and the like.

In an embodiment, the display system 10 may be implemented with a device capable of using or supporting a Mobile Industry Processor Interface (MIPI), e.g., a mobile device such as a mobile phone, a PDA, a PMP, a smartphone, or a wearable device.

The host processor 2000 may control the overall operations of the display module 1000. For example, the host processor 2000 may be implemented with a System On Chip (SOC). The host processor 2000 may be an Application Processor (AP) provided in a mobile device.

The host processor 2000 may directly communicate data with the display system 1000, i.e., a display driver integrated circuit (DDIC) 100 included in the display module 1000, through an interface. In an embodiment, the interface may correspond to the MIPI, and accord with MIPI Alliance Specification for Display Serial Interface and MIPI Alliance Specification for D-PHY. However, this is merely illustrative, and the communication interface between the host processor 2000 and the display driver integrated circuit 100 is not limited thereto. For example, the interface may be a serial high-speed interface for supporting a high-quality image of n-High Definition (nHD) or higher.

The host processor 2000 may output a data command CMD and output input image data IDAT. In an embodiment, the host processor 2000 may provide the display driver integrated circuit 100 with the data command CMD to command the display driver integrated circuit 100 to perform a predetermined function through the interface. The display driver integrated circuit 100 may perform the corresponding function, based on the command CMD.

The host processor 2000 may provide the input image data IDAT to the display driver integrated circuit 100 through the interface. The display driver integrated circuit 100 may convert the input image data IDATA to a data signal or data voltage suitable for image display. Additionally, the display driver integrated circuit 100 may provide the data signal or data voltage to a display panel 200.

The host processor 2000 and the display driver integrated circuit 100 may be connected through genuine product certification. Display system 10 cannot operate normally when at least one of the host processor 2000 and the display driver integrated circuit 100 is not a genuine product. A non-genuine product may be determined when at least one of the host processor 2000 and the display driver integrated circuit 100 is an imitation.

In an embodiment, the host processor 2000 and the display driver integrated circuit 100 may communicate security signals SS for genuine product certification with each other. Accordingly, the genuine product certification of the host processor 2000 and the display driver integrated circuit 100 can be performed.

For example, the host processor 2000 may perform encryption using a public key on a chip ID of the display driver integrated circuit 100. The genuine product certification of the host processor 2000 may be performed based on the encrypted data. However, this is merely illustrative, and the genuine product certification of the host processor 2000 may be performed by an encryption algorithm using a public key, a private key, etc.

The display module 1000 may include the display driver integrated circuit 100 and the display panel 200.

The display panel 200 may include a plurality of pixels and display an image.

The display driver integrated circuit 100 may be connected to the host processor 2000 through the interface and may receive a command CMD and input image data IDAT. Additionally, the display driver integrated circuit 100 may determine whether the host processor 2000 and the display driver integrated circuit 100 are genuine products, through the interface.

In an embodiment, encryption using a public key may be performed on a chip ID of the display driver integrated circuit 100. Additionally, the genuine product certification of the display driver integrated circuit 100 may be performed by comparing the encrypted data with encrypted data received from the host processor 2000. However, this is merely illustrative, and the genuine product certification of the display driver integrated circuit 100 is not limited thereto.

The display driver integrated circuit 100 may further include a timing controller and a data driver. The timing controller may generate a data signal for image display, a gate control signal, and a data control signal by receiving image data processed through the interface. The data driver may generate a data voltage based on the data signal and the data control signal.

In an embodiment, the display driver integrated circuit 100 may further include a scan driver configured to generate a scan signal, based on a scan control signal. However, this is merely illustrative, and the scan driver may be directly disposed in the display panel 200.

Figure 2:
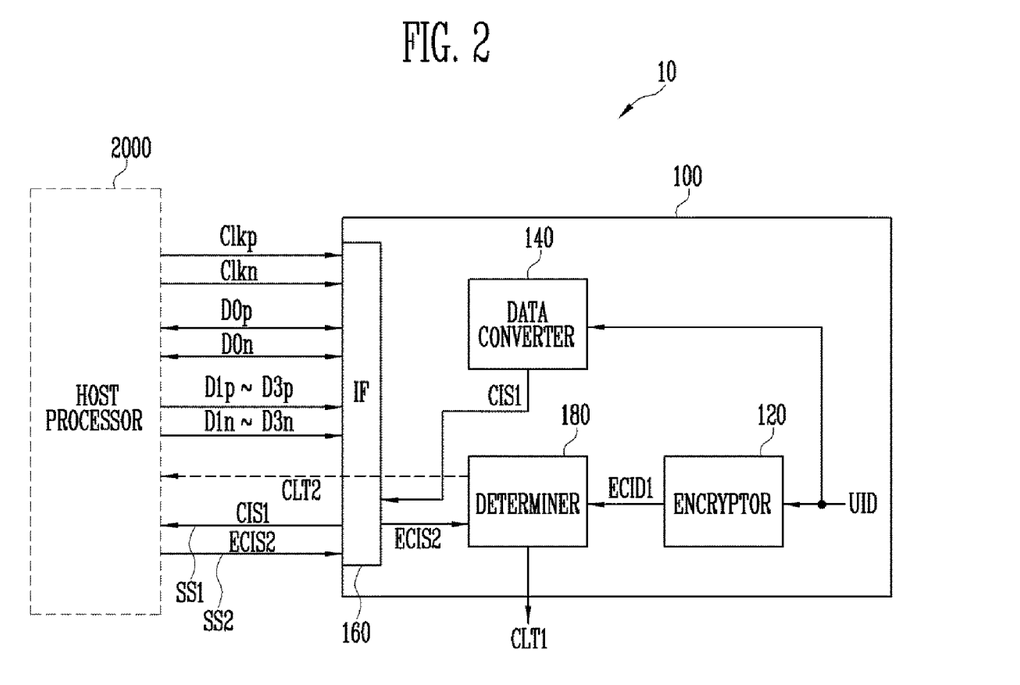
FIG. 2 is a block diagram schematically illustrating an example of a display driver integrated circuit in accordance with an embodiment of the present disclosure.

FIG. 2 is a block diagram schematically illustrating an example of a display driver integrated circuit in accordance with an embodiment of the present disclosure.

Referring to FIGS. 1 and 2, the display driver integrated circuit 100 may include an encryptor 120, a data converter 140, an interface 160, and a determiner 180.

The encryptor 120 may generate first encrypted data ECID1 by encrypting first data. The first data may be a unique chip identification (ID) UID of the display driver integrated circuit 100. For example, the display driver integrated circuit 100 stores the unique chip ID UID. The chip ID UID may be a unique ID for genuine product certification of the display driver integrated circuit 100.

The encryptor 120 may transmit the chip ID UID (or first data) to the determiner 180. The encryptor 120 may perform encryption on the chip ID UID when the display driver integrated circuit 100 wakes up. The encryptor 120 may be implemented with software or hardware.

In an embodiment, the encryptor 120 may be implemented with an algorithm established between a manufacturer of the host processor 2000 and a manufacturer of the display driver integrated circuit 100. For example, the algorithm established between the manufacturer of the host processor 2000 and the manufacturer of the display driver integrated circuit 100 may be a public key encryption algorithm. Accordingly, the host processor 2000 and the display driver integrated circuit 100 can perform encryption by using the same public key.

The data converter 140 may convert the chip ID UID to a first converted signal CIS including four or more voltage levels. The chip ID UID may be data in a digital format. Additionally, the data converter 140 may be a digital-analog converter configured to convert the chip ID UID in the digital format to the first converted signal CIS in an analog format.

In an embodiment, the data converter 140 may include a resistor string. The resistor string is configured to divide a first reference voltage and a second reference voltage into a plurality of voltage levels. For example, the data converter 140 may include a plurality of resistors connected in series.

The data converter 140 may provide the interface 160 with a first converted signal CIS1 including four or more voltage levels.

The data converter 140 may further include a security data generator. The security data generator is configured to generate security data unrelated to the chip ID UID and insert the security data in a random format into the chip ID UID. The security data may be garbage data excluded from cryptanalysis for genuine product certification. The security data may be added to the chip ID UID to reinforce the security of data communication through the interface 160.

The chip ID UID, into which the security data is inserted, may be converted to the first converted signal CIS1 including four or more voltage levels. For example, the first converted signal CIS1 may include a data security level (i.e., data security voltage level) corresponding to the security data and combinations of the other voltage levels corresponding to the chip ID UID. The chip ID UID may include combinations of eight voltage levels.

In an embodiment, the interface 160 may be a MIPI. The interface 160 of the display driver integrated circuit 100 may include a slave PHY (i.e., a slave physical layer). For example, a PHY configuration of the interface 160 of the display driver integrated circuit 100 may include one clock lane module and at least one data lane module. Each of such PHY lane modules may communicate with a corresponding lane module in the host processor 2000 through channels Clkp, Clkn, D0p to D3p, and D0n to D3n. The display driver integrated circuit 100 may receive the input image data IDAT shown in FIG. 1 and the command CMD, shown in FIG. 1, from the host processor 2000 through the interface 160.

In an embodiment, the PHY configuration of the interface 160 may further include a lane module for generating first and second converted signals CIS1 and ECIS2 for genuine product certification and first and security channels SS1 and SS2 for respectively transmitting the first and second converted signals CIS1 and ECIS2.

The interface 160 may provide the first converted signal CIS1 to the host processor 2000 through the first security channel SS1. Additionally, the interface 160 may include the second security channel SS2 for receiving, from the host processor 2000, the second converted signal ECIS2 obtained by converting second encrypted data generated by the host processor 2000.

In an embodiment, the first converted signal CIS1 and the second converted signal ECIS2 may be transferred through the security channels SS1 and SS2 when the display driver integrated circuit wakes up. Therefore, genuine product certification may be performed during a wake-up period.

The display driver integrated circuit 100 may receive the input image data IDAT (shown in FIG. 1), the command CMD (shown in FIG. 1), and the like from the host processor 2000 through the interface 160. Additionally, the display driver integrated circuit 100 may transmit the first converted signal CIS1 obtained by converting the chip ID UID to the host processor 2000 through the interface 160, and receive the second converted signal ECIS2 obtained by converting the second encrypted data from the host processor 2000 through the interface 160. The second converted signal ECIS2 may also include four or more voltage levels. Additionally, the second converted signal ECIS2 may be provided to the determiner 180.

Therefore, each of the signals transferred through the first and second security channels SS1 and SS2 may include four or more voltage levels.

In the case of conventional genuine product certification, data transmission for genuine product certification between the host processor 2000 and the display driver integrated circuit 100 is performed through the existing channels Clkp, Clkn, D0p to D3p, and D0n to D3n. In addition, since data for genuine product certification is transmitted in a digital manner using two voltage levels, the conventional genuine product certification is weak to security. Accordingly, the outflow of the chip ID UID and hacking/interpretation of the genuine product certification may be easily made.

In accordance with the embodiment of the present disclosure, the display driver integrated circuit 100 and the display system 10, having the same security channels SS1 and SS2 for genuine product certification, are separately formed and security data is converted into converted signals CIS1 and ECIS2. The converted signals CIS1 and ECIS2 include four or more voltage levels including a data security level. Additionally, the converted signals CIS1 and ECIS2 are transmitted through the security channels SS1 and SS2. Thus, the genuine product certification of an electronic device and the security of the chip ID UID can be reinforced. Additionally, the production and spread of imitations and illegal reproductions can be prevented.

In an embodiment, at least some of the encryptor 120, the data converter 140, and the determiner 180 may be included in the PHY configuration of the interface 160.

The determiner 180 may control the display panel 200 shown in FIG. 1 and the host processor 2000 by comparing converted data corresponding to the first encrypted data ECID1 and the second encrypted data. The determiner 180 may convert the second converted signal ECIS2 to a third encrypted data and compare the third encrypted data and the first encrypted data ECID1. The second converted signal ECIS2 may be a signal to which the host processor 2000 converts the second encrypted data to include a plurality of voltage levels. The third encrypted data may be a value obtained by re-converting the second converted signal ECIS2 to data in a digital format.

The determiner 180 may control the host processor 2000 and the display driver integrated circuit 100, based on the result obtained by comparing the third encrypted data and the first encrypted data ECID1.

In an embodiment, the third encrypted data may be data obtained by converting combinations of valid voltages, except a data security level unrelated to the chip ID UID to data in a digital format from the second converted signal ECIS2. Accordingly, the first encrypted data ECID1, and the third encrypted data can be compared with each other.

In an embodiment, the determiner 180 may output control signals CLT1 and CLT2 such that the host processor 2000 and the display driver integrated circuit 100 operate normally when the first encrypted data ECID1 and the third encrypted data are equal. For example, when the first encrypted data ECID1 and the third encrypted data are equal, the genuine product certification may be completed, and the display system 10 may operate normally.

The genuine product certification fails when the first encrypted data ECID1, and the third encrypted data are different from each other. For example, at least one of the host processor 2000 and the display driver integrated circuit 100 is an imitation when the first encrypted data ECID1 and the third encrypted data are different from each other In an embodiment, the determiner 180 may output a first control signal CLT1 for stopping driving the display driver integrated circuit 100 or stopping driving except a specific operation when the first encrypted data ECID1 and the third encrypted data are different from each other. For example, a black image may be displayed on the display panel 200 by the first control signal CLT1. An imitation warning message may also be displayed on the display panel 200 by the first control signal CLT1.

In an embodiment, the determiner 180 may output a second control signal CLT2 for stopping driving the host processor 2000 or stopping driving except a specific operation when the first encrypted data ECID1 and the third encrypted data are different from each other. For example, a black image may be displayed on the display panel 200 by the second control signal CLT2. An imitation warning message may also be displayed on the display panel 200 by the second control signal CLT2. Alternatively, access to a call function, an Internet connection function, a camera function, etc. may be restricted by the second control signal CLT2.

Thus, the encryptor 120 may encrypt first data (including a chip ID) to produce encrypted first data ECID1. The data converter 140 may convert the first data from a digital format to an analog format including four or more voltage levels (thereby producing first converted signal CIS1). The interface 160 may transmit the first converted signal CIS1 to the host processor 2000. The interface 160 may receive encrypted second data ECIS2 from the host processor 2000 in response to the first converted signal CIS1. Then, the determiner 180 may compare the encrypted first data ECID1 with the encrypted second data ECIS2 and control the display panel 200 based at least in part on the comparison.

Figure 3:
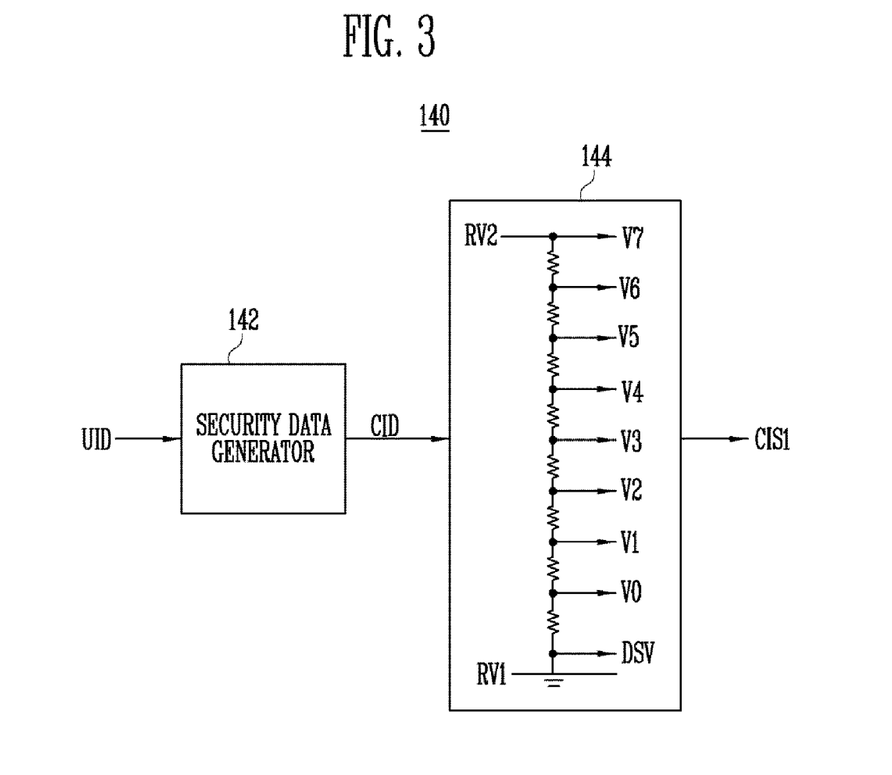
FIG. 3 is a diagram illustrating an example of a data converter included in the display driver integrated circuit shown in FIG. 2.
Figure 4:
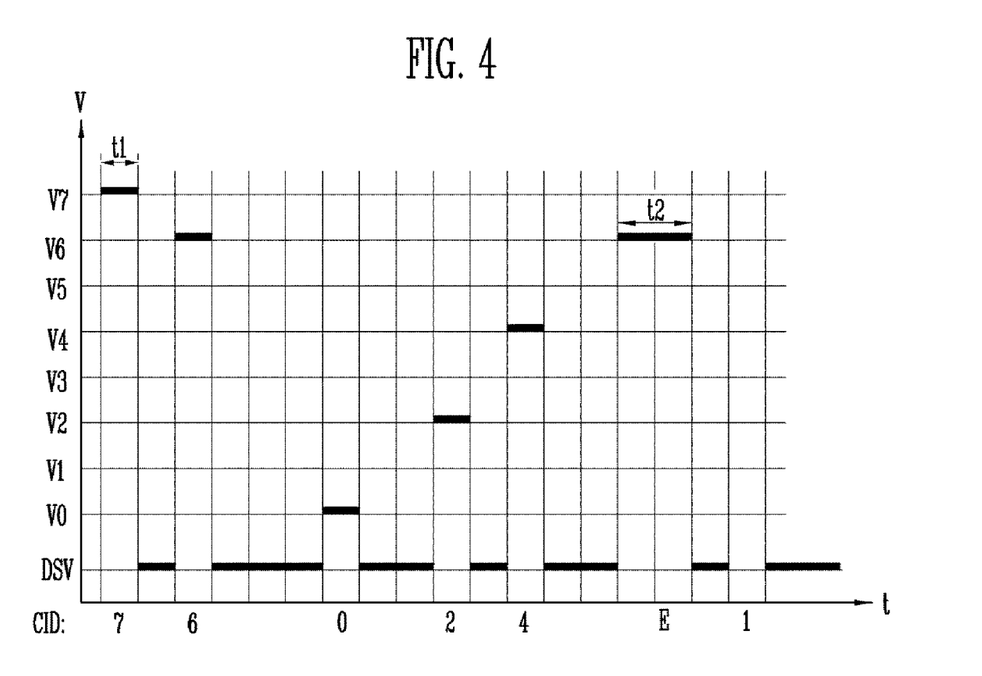
FIG. 4 is a diagram illustrating an example of an operation of the data converter shown in FIG. 3.

FIG. 3 is a diagram illustrating an example of the data converter included in the display driver integrated circuit shown in FIG. 2. FIG. 4 is a diagram illustrating an example of an operation of the data converter shown in FIG. 3.

Referring to FIGS. 2 to 4, the data converter 140 may include a security data generator 142 and a digital-analog converter 144.

The data converter 140 may convert a chip ID UID to a first converted signal CIS1 including four or more voltage levels.

The security data generator 142 may generate security data and insert the security data in a random format into the chip ID UID. Second data CID obtained by inserting the security data into the chip ID UID may be supplied to the digital-analog converter 144. The security data is garbage data excluded from encryption interpretation for genuine product certification and the second data CID may be implemented in a digital format.

The digital-analog converter 144 may convert the second data CID to the first converted signal CIS1 in an analog format. In an embodiment, the digital-analog converter 144 may include a resistor string for dividing a first reference voltage RV1 and a second reference voltage RV2 into a plurality of voltage levels. For example, as shown in FIG. 3, the first reference voltage RV1, and the second reference voltage RV2 may be divided into eight valid voltage levels V0 to V7 and one security level DSV. The digital-analog converter 144 may express the second data CID with nine voltage levels by using the resistor string.

Although a case where the security level DSV is a least significant voltage level is illustrated in FIG. 3, the potential of the security level DSV is not limited thereto. For example, the security level DSV may be replaced with one of a first to eighth valid voltage levels V0 to V7. The least significant voltage level may be changed to one value among the first to eighth valid voltage levels V0 to V7. In addition, the number of the valid voltage levels V0 to V7 and the security level DSV is not limited thereto. For example, the digital-analog converter 144 may convert the second data CID to outputs of 17 voltage levels.

In an embodiment, the first converted signal CIS1 corresponding to the second data CID may be output as shown in FIG. 4. Voltage levels respectively corresponding to numbers of the chip ID UID may be determined. In addition, the security level DSV between outputs of valid voltages may be output during a random time.

For example, the eighth voltage level V7 may be output during a first time, corresponding to 7 included in the chip ID UID. Additionally, the seventh voltage level V6 may be output during the first time t1, corresponding to 6 included in the chip ID UID. The seventh voltage level V6 may be output during a second time t2, corresponding to E included in the chip ID UID when the chip ID UID is expressed with hexadecimal numbers. For example, the second time t2 may be longer than the first time t1.

However, this is merely illustrative. The valid voltages may be determined by a rule set for genuine product certification. Valid voltages may respectively correspond to the values included in the chip ID UID and output times of the valid voltages.

The first converted signal CIS1 converted by the data converter 140 may be provided to the host processor 2000 through the interface 160. For example, the security data (garbage data) and the data of the chip ID UID may be supplied as output combinations of nine voltage levels to the host processor 2000. Thus, the security of the chip ID UID and the security of the genuine product certification can be considerably reinforced.

Figure 5:
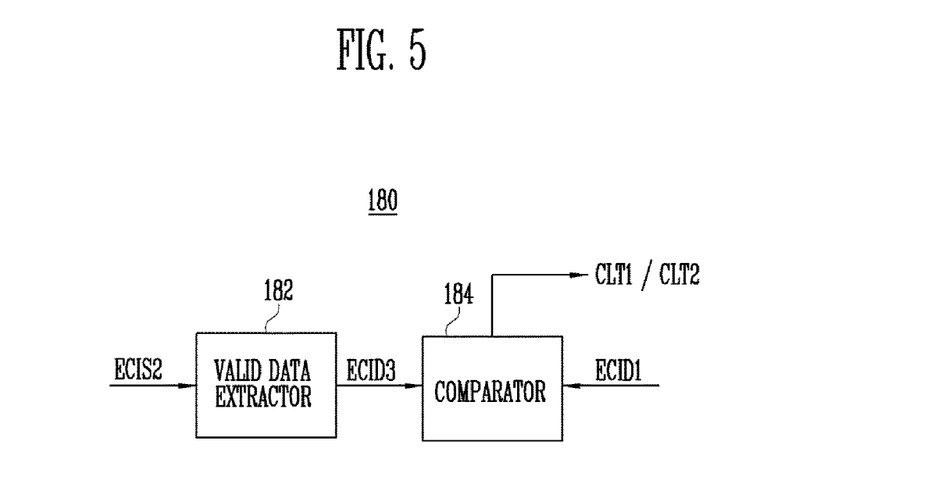
FIG. 5 is a block diagram illustrating an example of a determiner included in the display driver integrated circuit shown in FIG. 2.

FIG. 5 is a block diagram illustrating an example of the determiner included in the display driver integrated circuit shown in FIG. 2.

Referring to FIGS. 2, 3, and 5, the determiner 180 may include a valid data extractor 182 and a comparator 184.

The valid data extractor 182 may receive a second converted signal ECIS2 from the interface 160.

The second converted signal ECIS2 may be a signal to which second encrypted data generated by the host processor 2000 converted in an analog format for the purpose of transmission between interfaces. For example, the host processor 2000 may convert the second encrypted data to the second converted signal ECIS2 by using a configuration like that of the data converter 140 shown in FIG. 3. Encryption on the first converted signal CIS1 may be applied to the second encrypted data. For example, the second encrypted data may be generated based on the same public key as a public key algorithm.

The valid data extractor 182 may convert the second converted signal ECIS2 to a third encrypted data ECID3 corresponding to the valid voltages except the data voltage level DSV shown in FIG. 3. In an embodiment, the valid data extractor 182 may include an analog-digital converter that is configured to convert the second converted signal ECIS2 to data in a digital format.

In an embodiment, the valid data extractor 182 may remove security data corresponding to the data voltage level from the data converted in the digital format. The third encrypted data ECID3 from which the security data is removed may be provided to the comparator 184. For example, the third encrypted data ECID3 may correspond to data obtained by encrypting the chip ID UID, using the public key algorithm.

The comparator 184 may receive the first encrypted data ECID1 from the encryptor 120 and receive the third encrypted data ECID3 from the valid data extractor 182. The comparator 184 may compare the first encrypted data ECID1 and the third encrypted data ECID3.

In an embodiment, both the first encrypted data ECID1 and the third encrypted data ECID3 are encrypted data obtained by applying the same public key encryption algorithm to the chip ID UID. Therefore, the genuine product certification may be completed when the first encrypted data ECID1 and the third encrypted data ECID3 are equal, enabling the display system 10 to operate normally.

At least one of the host processor 2000 and the display driver integrated circuit 100 is an imitation when the first encrypted data ECID1 and the third encrypted data ECID3 are different from each other. In an embodiment, the comparator 184 may output a first control signal CLT1 for stopping the driving of the display driver integrated circuit 100 or stopping driving except a specific operation when the first encrypted data ECID1 and the third encrypted data ECID3 are different from each other. Alternatively, in an embodiment, the comparator 184 may output a second control signal CLT2 for stopping driving of the entire or a portion of the host processor 2000.

Accordingly, the display system 10 may be controlled not to operate normally when at least one of the host processor 2000 and the display driver integrated circuit 100 is not an imitation.

Figure 6:
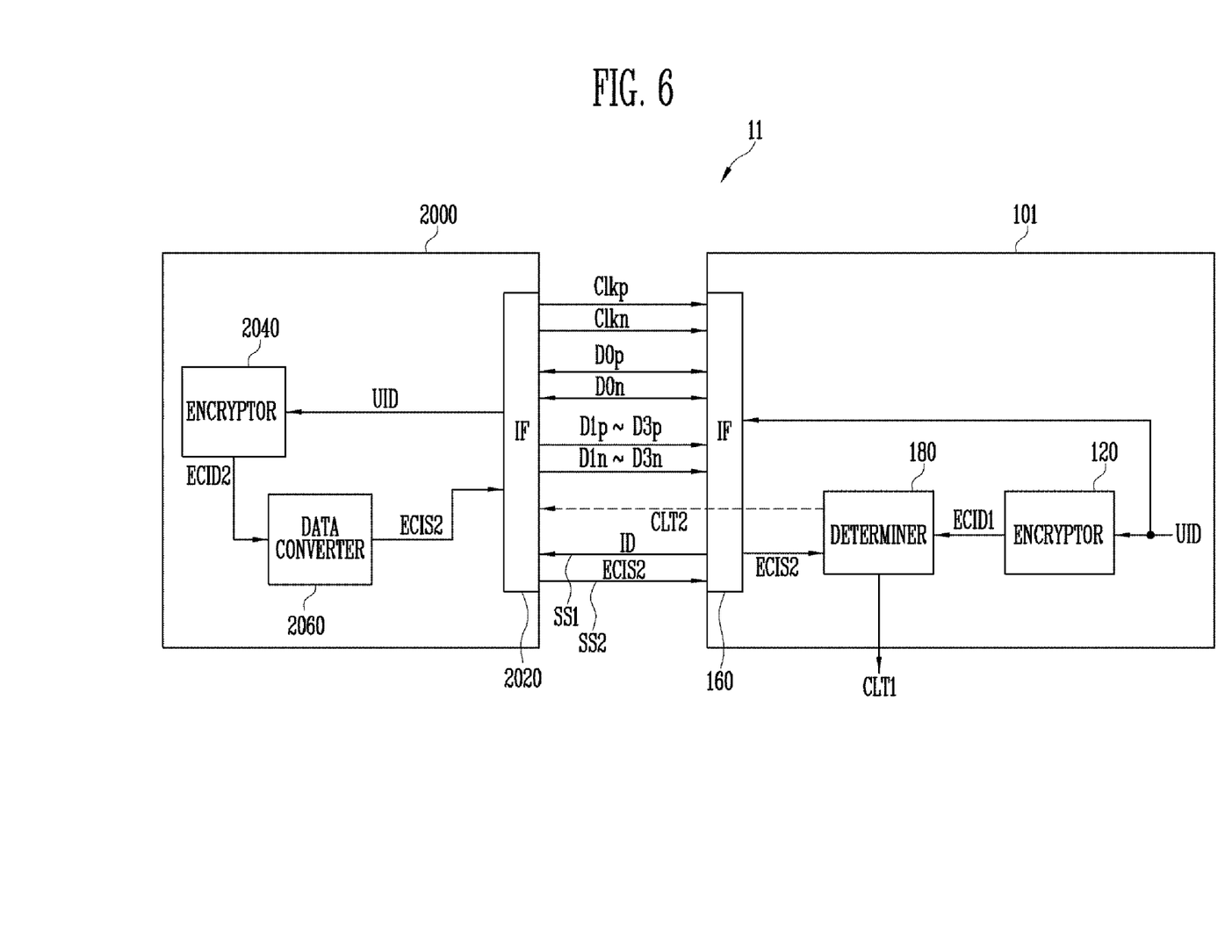
FIG. 6 is a block diagram illustrating an example of a portion of the display system.

FIG. 6 is a block diagram illustrating an example of a portion of the display system.

In FIG. 6, components identical to those described with reference to FIG. 2 are designated by like reference numerals, and their overlapping descriptions will be omitted.

Referring to FIGS. 1, 2, and 6, the display system 11 may include a host processor 2000 and a display driver integrated circuit 101.

In an embodiment, the display driver integrated circuit 101 may include an encryptor 120, an interface 160, and a determiner 180. The display driver integrated circuit 100 may provide a chip ID UID in a digital format to the host processor 2000 through a first security channel SS1.

The display driver integrated circuit 101 shown in FIG. 6 has a configuration and an operation, which are partially different from those of the display driver integrated circuit 100 shown in FIG. 2, in that the chip ID UID is not converted to data (first converted signal) in an analog format.

The host processor 2000 may include an interface 2020, an encryptor 2040, and a data converter 2060. The host processor 2000 may encrypt the chip ID UID and convert the encrypted chip ID UID to a second converted signal ECIS2 including four or more voltage levels. The host processor 2000 may then transmit the second converted signal ECIS2 to the display driver integrated circuit 101.

The interface 2020 may be an MIPI. The interface 2020 may communicate with the interface 160 of the display driver integrated circuit 101.

The encryptor 2040 may substantially perform the same operation as the encryptor 120 of the display driver integrated circuit 101. In an embodiment, the encryptor 2040 may be implemented with an algorithm established between a manufacturer of the host processor 2000 and a manufacturer of the display driver integrated circuit 101. For example, the encryptor 2040 may generate second encrypted data ECID2 by applying a public key encryption algorithm to the chip ID UID.

The encryptor 2040 may provide the second encrypted data ECID2 to the data converter 2060.

The data converter 2060 may convert the second encrypted data ECID2 to a second converted signal ECIS2 including four or more voltage levels. For example, the second encrypted data ECID may be converted to a second converted signal ECIS2, including eight voltage levels.

In an embodiment, an operation and a configuration of the data converter 2060 may be substantially identical to those of the data converter 140 shown in FIGS. 2 and 3. The second converted signal ECIS2 may be provided to the display driver integrated circuit 101 through the interface 2020.

As described above, encrypted data converted in an analog format is transmitted through separate security channels SS1 and SS2 to perform genuine product certification. The genuine product certification occurs between the host processor 2000 and the display driver integrated circuit 101, so that the genuine product certification of an electronic device and the security of the chip ID UID can be reinforced.

Further, the display system 11 shown in FIG. 6 includes a structure simpler than that of the display system 10 shown in FIG. 2. In some cases, using a simpler structure may reduce manufacturing costs.

Figure 7:
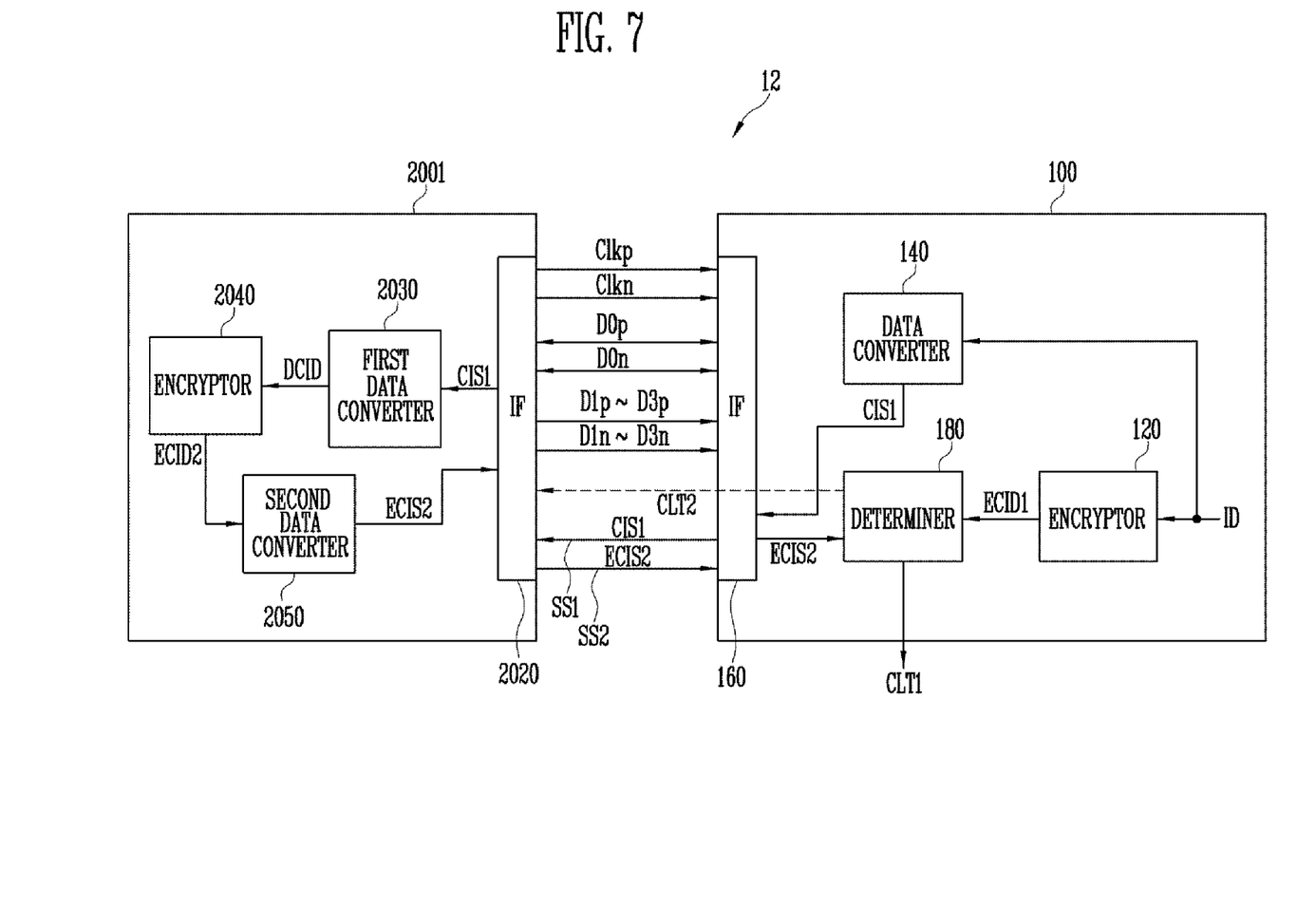
FIG. 7 is a block diagram illustrating an example of a portion of the display system.

FIG. 7 is a block diagram illustrating an example of a portion of the display system.

In FIG. 7, components identical to those described with reference to FIGS. 2 and 6 are designated by like reference numerals, and their overlapping descriptions will be omitted.

Referring to FIGS. 1, 2, 6, and 7, the display system 12 may include a host processor 2001 and a display driver integrated circuit 100.

The display driver integrated circuit 100 may include an encryptor 120, a data converter 140, an interface, and a determiner 180. The display driver integrated circuit 100 may be substantially identical to the display driver integrated circuit 100 shown in FIG. 2. The display driver integrated circuit 100 may provide a first converted signal CIS1 in an analog format to the host processor 2001 through a first security channel SS1.

The host processor 2001 may include an interface 2020, a first data converter 2030, an encryptor 2040, and a second data converter 2050.

The first data converter 2030 may convert the first converted signal CIS1 to converted data DCID in a digital format. For example, the first data converter 2030 may include an analog-digital converter that is to convert the first converted signal CIS1 to the converted data DCID in the digital format.

The encryptor 2040 may encrypt the converted data DCID. For example, the encryptor 2040 may generate second encrypted data ECID2 by applying a public key encryption algorithm to the converted data DCID.

The second data converter 2050 may convert the second encrypted data ECID2 to a second converted signal ECIS2 in an analog format. The second data converter 2050 may include a digital-analog converter and be substantially identical to the data converter 140 shown in FIGS. 2 and 3.

The second converted signal ECIS2 may be provided to the display driver integrated circuit 100 through the interface 2020.

As described above, the first and second converted signals CIS1 and ECIS2 may be transmitted in an analog format having four or more voltage levels through first and second security channels SS1 and SS2, so that the genuine product certification of an electronic device and the security of the chip ID UID can be reinforced.

Figure 8:
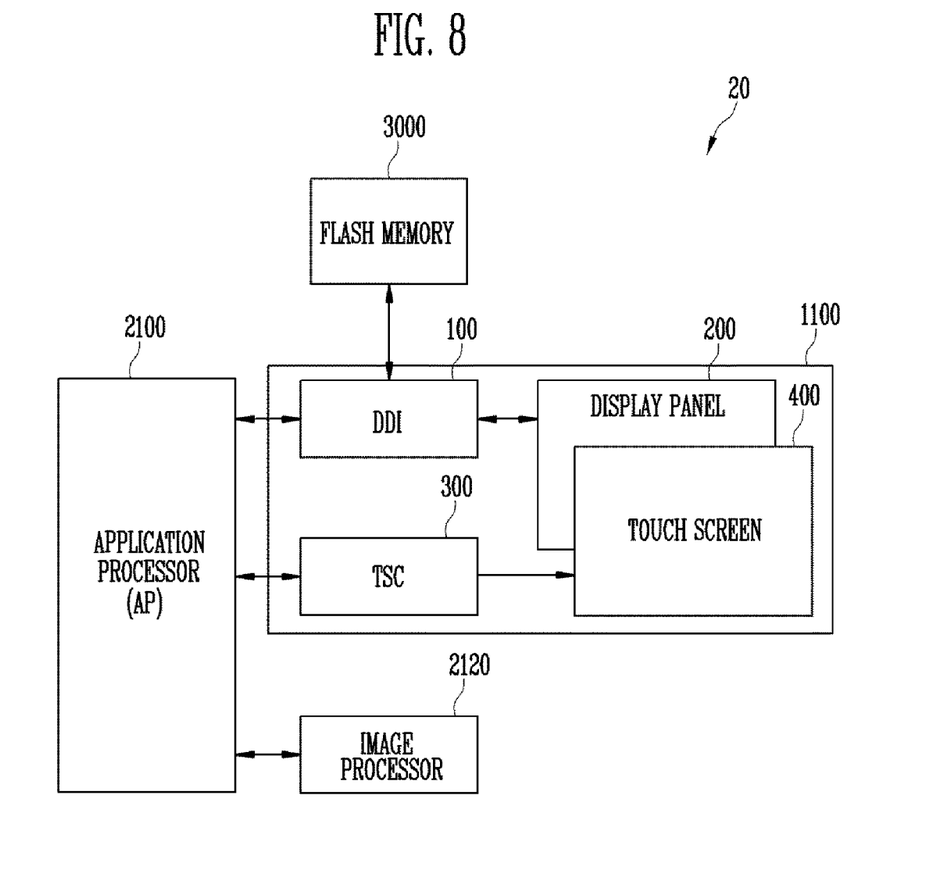
FIG. 8 is a block diagram illustrating a touch screen system to which a display system is applied in accordance with an embodiment of the present disclosure.

FIG. 8 is a block diagram illustrating a touch screen system to which a display system is applied in accordance with an embodiment of the present disclosure.

In FIG. 8, components identical to those described with reference to FIG. 1 are designated by like reference numerals, and their overlapping descriptions will be omitted.

Referring to FIG. 8, the display system 20 may include an application processor (AP) 2100, an image processor 2120, a display module 1100, and a flash memory 3000. The display module 1100 may include a display driver integrated circuit (DDI) 100, a display panel 200, a touch screen controller (TCS) 300, and a touch screen 400.

The AP 2100 may receive data or a command from a user and control the display driver integrated circuit 100 and the touch screen controller 300, based on the input data or command. The AP 2100 may be implemented with a graphic card, a System On Chip (SOC), etc.

The AP 2100 may be included in the host processor shown in FIG. 1 and provide image data of the display panel 200 to the display driver integrated circuit 100.

The image processor 2120 may process image data. The image processor 2120 may generate image data to be provided to the display driver integrated circuit 100, based on a touch signal provided from the touch screen controller 300. The image processor 2120 may also perform image processing on image data. In an embodiment, the image processor 2120 may be provided in the AP 2100.

The flash memory 3000 may store data for image compensation. The flash memory 3000 may provide data for image compensation to the display driver integrated circuit 100.

The display driver integrated circuit 100 may drive the display panel 200 under the control of the AP 2100.

The display panel 200 may display an image signal received from the display driver integrated circuit 100.

The touch screen controller 300 may be connected to the touch screen 400, to receive sensing data from the touch screen 400 and transfer the sensing data to the AP 2100.

The touch screen 400 may overlap with the display panel 200. In an embodiment, the touch screen 400 may be integrally implemented with the display panel 200.

In an embodiment, the display driver integrated circuit 100 and the touch screen controller 300 may share a plurality of functional blocks and be implemented with a single semiconductor chip.

In the display driver integrated circuit and the display system having the same in accordance with the present disclosure, security channels for genuine product certification are formed separately from channels for transmitting image data or a command. Security data is converted to converted signals each including four or more voltage levels including a data security level and the converted signals are transmitted through the security channels. Thus, the genuine product certification of an electronic device and the security of the chip ID can be reinforced, and the production and spread of imitations and illegal reproductions can be prevented.

Example embodiments have been disclosed herein, and although specific terms are employed, the embodiments are used and are to be interpreted in a generic and descriptive sense only. The embodiments are not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display driver integrated circuit comprising:
   an encryptor configured to generate first encrypted data by encrypting first data;
   a data converter configured to convert the first data into a first converted signal including four or more voltage levels including a data security level corresponding to security data and combinations of the other voltage levels corresponding to values included in a chip identification (ID);
   an interface configured to provide the first converted signal to a host processor, and receive a second converted signal corresponding to second encrypted data generated by the host processor; and
   a determiner configured to control a display panel by comparing the first encrypted data with converted data corresponding to the second encrypted data,
   wherein the second converted signal received by the interface includes the four or more voltage levels, and
   wherein the second encrypted data corresponds to data obtained by encrypting the first converted signal.

2. The display driver integrated circuit of claim 1, wherein the first data is a unique chip identification (ID) of the display driver integrated circuit.

3. The display driver integrated circuit of claim 2, wherein the data converter comprises:
   a digital-analog converter configured to convert the first data from a digital format to the first converted signal.

4. The display driver integrated circuit of claim 2, wherein the data converter comprises:
   a resistor string configured to divide a first reference voltage and a second reference voltage into the voltage levels.

5. The display driver integrated circuit of claim 2, wherein the first converted signal includes the data security level unrelated to the chip ID.

6. The display driver integrated circuit of claim 5, wherein the data security level corresponds to a voltage level selected one from the four or more voltage levels,
   wherein the chip ID corresponds to voltage levels other than the selected voltage level.

7. The display driver integrated circuit of claim 5, wherein the data converter further comprises:
   a security data generator configured to insert the security data in a random format into the chip ID,
   wherein the security data includes the data security level.

8. The display driver integrated circuit of claim 1, wherein the interface accords with a Mobile Industry Processor Interface (MIPI) Alliance Specification for Display Serial Interface and a MIPI Alliance Specification for D-PHY, and
   wherein the display driver integrated circuit further comprises:
   security channels configured to transfer the first converted signal to the host processor, and receive the second converted signal from the host processor, wherein the security channels are formed separately from other channels of the display driver integrated circuit for transmitting image data.

9. The display driver integrated circuit of claim 8, wherein the first converted signal and the second converted signal are transferred through the security channels when the display driver integrated circuit wakes up.

10. The display driver integrated circuit of claim 1, wherein the determiner comprises:
    a valid data extractor configured to convert the second converted signal into third encrypted data including valid voltages other than the data security level unrelated to the first data; and
    a comparator configured to compare the first encrypted data and the third encrypted data, and output a control signal for controlling at least one of the host processor and the display panel based on the comparison.

11. The display driver integrated circuit of claim 10, wherein the host processor and the display driver integrated circuit operate normally when the first encrypted data and the third encrypted data are equal to each other.

12. The display driver integrated circuit of claim 10, wherein the comparator stops driving at least one of the host processor and the display driver integrated circuit when the first encrypted data and the third encrypted data are different from each other.

13. A display system comprising:
    a host processor configured to encrypt a chip identification (ID), convert and output the encrypted chip ID using four or more voltage levels including a data security level corresponding to security data and combinations of the other voltage levels corresponding to values included in the chip ID, and output a data load command and input image data; and
    a display module controlled by the host processor,
    wherein the display module comprises:
    a display panel including a plurality of pixels for displaying an image based on the input image data; and
    a display driver integrated circuit configured to provide the chip ID in a digital format to the host processor, generate first encrypted data obtained by encrypting the chip ID, and control the display module based on comparing the first encrypted data with data received from the host processor.

14. The display system of claim 13, wherein the host processor comprises:
    a first encryptor configured to generate second encrypted data by encrypting the chip ID;

a data converter configured to convert the second encrypted data into a converted signal including four or more voltage levels; and an interface configured to receive the chip ID from the display driver integrated circuit, and transmit the converted signal to the display driver integrated circuit.

15. The display system of claim 14, wherein the display driver integrated circuit includes:

a second encryptor configured to generate the first encrypted data by encrypting the chip ID; and a determiner configured to re-convert the converted signal to the second encrypted data in a digital format, compare the second encrypted data and the first encrypted data, and control at least one of the host processor and the display driver integrated circuit, based on the comparison result.

16. The display system of claim 15, wherein the chip ID and the converted signal are transmitted between the host processor and the display driver integrated circuit through security channels instead of channels for transmitting the input image data and the data load command when the display driver integrated circuit wakes up.

17. The display system of claim 13, wherein the display driver integrated circuit comprises:

a first encryptor configured to generate the first encrypted data by encrypting the chip ID;

a data converter configured to convert the chip ID into a first converted signal in an analog format which includes the four or more voltage levels;

an interface configured to provide the first converted signal to the host processor, and receive a second converted signal corresponding to second encrypted data generated by the host processor; and a determiner configured to control the display panel by comparing the first encrypted data with data converted from the second encrypted data.

18. The display system of claim 17, wherein the data converter inserts security data in a random format into the chip ID, and converts the chip ID having the security data into the first converted signal in the analog format.

19. The display system of claim 17, wherein the host processor comprises:

a first data converter configured to convert the first converted signal into converted data in a digital format;

a second encryptor configured to generate the second encrypted data by encrypting the converted data;

a second data converter configured to convert the second encrypted data into a second converted signal including the four or more voltage levels; and an interface configured to receive the first converted signal from the display driver integrated circuit, and transmit the second converted signal to the display driver integrated circuit.

20. A method of component verification, the method comprising:

encrypting first data that includes a chip identification (ID);

converting the first data from a digital format to an analog format including four or more voltage levels including a data security level corresponding to security data and combinations of the other voltage levels corresponding to values included in the chip ID;

transmitting the converted first data to a host processor;

receiving encrypted second data from the host processor in response to the converted first data; and comparing the encrypted first data with the encrypted second data; and controlling a display based at least in part on the comparison.

* * * * *